Figure 1:
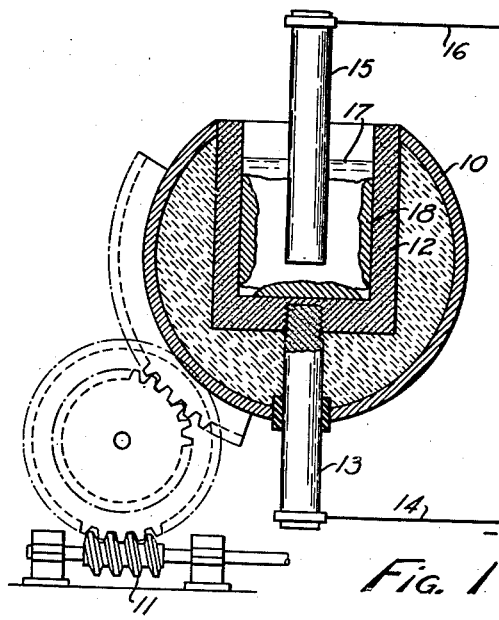

March 21, 1944.  A. L. FOX  2,344,859

METHOD OF PRODUCING CALCIUM BORIDE

Filed Feb. 7, 1941

INVENTOR
A. L. Fox
By Leo Keller
ATTORNEY

Patented Mar. 21, 1944

2,344,859

UNITED STATES PATENT OFFICE 2,344,859

METHOD OF PRODUCING CALCIUM BORIDE

Abraham L. Fox, Boulder City, Nev.

Application February 7, 1941, Serial No. 377,765

6 Claims. (Cl. 204—61)

This invention relates to the manufacture of calcium boride.

It is an object of this invention to provide a commercially feasible method of producing calcium boride ($CaB_6$) from commercially available materials. Among these may be named commercially pure lime (CaO), boric oxide ($B_2O_3$), calcium chloride ($CaCl_2$), and colemanite, the latter being a mineral having the composition represented by the formula $2CaO.3B_2O_3.5H_2O$, large deposits of which occur in Clark County, Nevada.

A further object of this invention is to provide a method of manufacturing calcium boride by molten electrolysis, a subsidiary object of the invention being to obtain and maintain a molten bath composition which is highly efficient for the production of calcium boride.

A further object of the invention is to devise a method for removing high melting point borides and other electrolytically formed materials from the cathods at which they are formed from a molten electrolyte.

A further object of the invention is to provide a novel means for agitating a molten electrolyte during the process of electrolysis.

A further object of the invention is to provide a continuously operative method and apparatus for producing calcium boride.

Other objects of this invention will become apparent from the following specification and claims, in connection with the drawing forming a part hereof.

While calcium boride is not a highly used material, it had already found commercial utility as a deoxidant for copper (see, for example, U. S. Patent 2,183,592 to H. F. Silliman, dated Dec. 19, 1939) and other metals and alloys. Calcium boride may also be regarded as a source for elemental boron, for which many uses are known. Other uses for calcium boride will undoubtedly develop as soon as a commercially feasible process for producing it, such as disclosed herein, becomes generally available.

Calcium boride has previously been prepared experimentally by molten electrolysis of a bath comprising lime and boric oxide, to which calcium chloride had been added as a flux to lower the melting point of the bath and to increase the fluidity and conductivity thereof. A graphite crucible had been used as a cathode, and calcium boride crystals had been found adhering to the crucible after the bath had been allowed to cool and solidify. It had been suggested that in commercial production the calcium boride could be tapped off from the molten bath. It was found impossible to tap off the calcium boride in practice, however, without resorting to excessively high temperatures, because at any reasonable temperatures (up to 1475° C.) the calcium boride remains upon the cathode as a solid paste.

In accordance with the present invention, the boride which has collected at the cathode may be removed by pouring off the molten electrolytic bath and immediately scraping the boride paste from the hot cathode.

A large number of tests has shown that for most satisfactory production of calcium boride, the preferred composition of the bath comprises two parts CaO, one to two parts $B_2O_3$, and twenty parts $CaCl_2$. This ratio of components of the bath should preferably be maintained throughout the operation by the addition of lime and boric oxide as these are consumed.

It has been found that, because of the reaction taking place at the cathode, a preponderance of CaO formed at the cathode remains as a constituent of the cathode product, requiring considerable leaching in order to obtain the pure boride. It was found that the CaO content of the cathode material could be reduced by agitating the bath to disperse the CaO formed at the cathode. A preferred method of agitation in accordance with this invention is to rotate the cathode in the molten bath.

While this invention relates primarily to the manufacture of calcium boride, certain steps of the process are equally applicable to the manufacture of other high melting point products prepared electrolytically, and are more particularly applicable to the manufacture of such high melting point borides as those of the alkaline and alkaline earth metals, iron, nickel, cobalt, chromium, manganese, magnesium, beryllium, aluminum, tungsten, molybdenum, vanadium, titanium, zirconium, tantalum and silicon.

Figure 2:
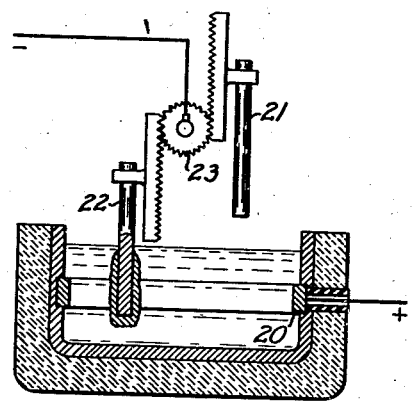
Figure 3:
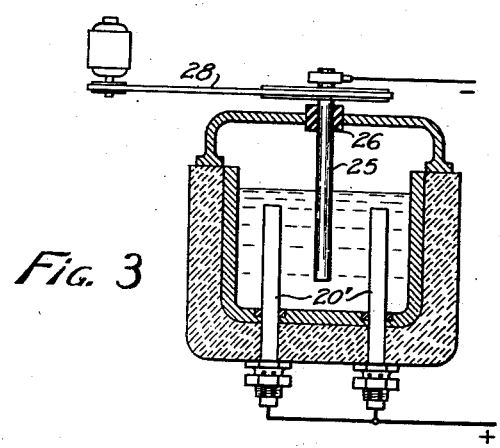
Figure 4:
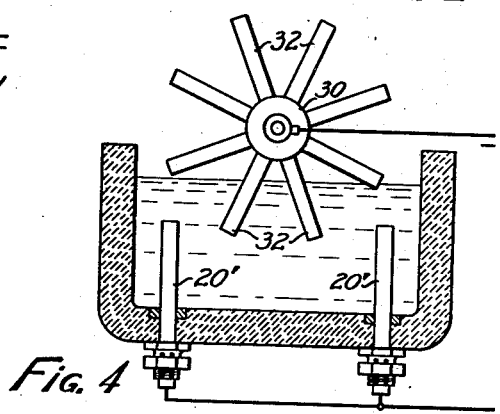
Figure 5:
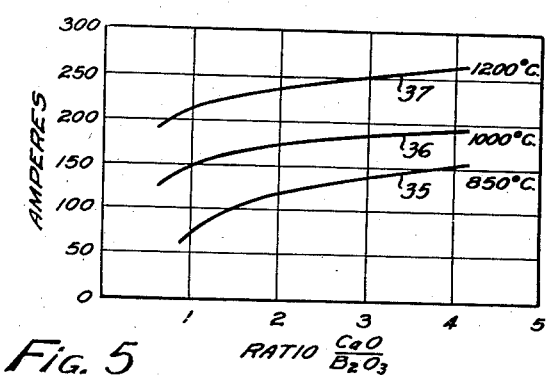
Figure 6:
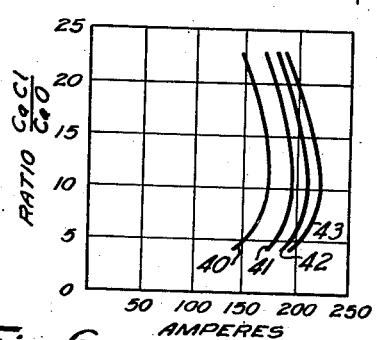

Referring now to the attached drawing for a more detailed description of the invention, Fig. 1 is a diagrammatic view of a tilting electrolytic cell; Fig. 2 is a diagrammatic view of an electrolytic cell provided with alternately immersible electrodes; Fig. 3 is a diagrammatic view of an electrolytic cell provided with a rotary electrode for agitating the electrolytic bath; Fig. 4 is a diagrammatic view of an electrolytic cell designed for continuous rather than batch operation; Fig. 5 shows a series of curves illustrating change in conductivity of the bath at various temperatures with change in ratio of CaO to $B_2O_3$; and Fig. 6 is a series of curves illustrating change in conductivity of bath with change in the ratio of CaCl₂ to CaO.

The electrolytic cell shown in Fig. 1 comprises a cylindrical cradle 10 arranged to be rotated about its horizontal longitudinal axis by means of worm 11 thru appropriate gearing. The cradle carries a crucible 12, which may be made of graphite, and has a graphic lead 13 threaded into the bottom of the crucible and connected at 14 with the negative terminal of a D. C. source of electric power (not shown), thereby making the crucible the cathode of the cell. The anode comprises an electrode 15 connected at 16 with the positive terminal of the D. C. source. The crucible may be heated by any desired heating means (not shown), and contains the ingredients of the bath. For the production of calcium boride, the bath comprises CaO, B₂O₃, and CaCl₂. During operation, the materials become liquid as indicated at 17, and cathode product, which contains a high proportion of calcium boride, deposits as a paste 18 on the bottom and side walls of the cathode. The boride paste changes to a hard, crystalline mass when cold.

To remove the cathode product in accordance with this invention, the anode 15 is raised to remove it from the crucible, and the cradle 10 is rotated by means of worm 11 to dump the molten bath into a suitable receptacle. The cathode product is then scraped from the walls of the crucible before the crucible cools, the scraping operation being preferably performed with a tool which fits the configuration of the interior of the crucible. The cathode product is at this time in the condition of a paste. After cooling, this material is ground to a powder, and leached with hydrochloric acid to remove the CaO, B₂O₃ and CaCl₂ in the cathode product.

In one ten-day run, the following results were obtained:

Weight of unleached cathode
product_____ 200 lbs. 10 oz.
Analysis of cathode product:
    CaO _____ 11.2%
    B₂O₃ _____ 6.4%
    CaCl₂ _____ 57.6%
    HCl insoluble_____ 25.0%
Weight of HCl used in leach, 19.20° Bé_ 188.1 lbs.
Weight of water used in leach_____ 308.0 lbs.
Weight of leached product_____ 50 lbs. 2 oz.
Weight of reduced Ca in CaB₆_____ 17.04 lbs.
Weight of reduced B in CaB₆_____ 28.07 lbs.

The purity of the resultant product obtained in the above run will be apparent from the percentage analysis given below:

|  | Per cent |
|---|---|
| H₂O at 110° C | 0.5 |
| Water soluble | 5.1 |
| Reduced Ca | 34.0 |
| Reduced B | 56.0 |
| SiO₂ | 2.1 |
| Fe | 0.2 |
| Al₂O₃ | 1.2 |
| B₆C | 0.2 |
| C | 0.2 |

It is believed that, with greater care in the drying and in the selection of raw material, an even greater proportion of Ca plus B would be obtained.

Contrary to the results obtained by previous investigators, it was found by carefully controlled experiment that calcium boride is somewhat soluble in water, and particularly so in the presence of air, as when the moist product is being dried. This indicates the desirability of drying the material rapidly after the leaching step, as by passing the material rapidly thru a drying chamber in a thin layer, or by the use of vacuum drying.

In order not to disturb or interrupt the electrolytic process during removal of the cathode product, an arrangement such as is shown in Fig. 2 may be utilized. Here a ring 20 may be utilized as the anode, while the cathode comprises two or more electrodes 21 and 22, which are alternately raised and lowered by a rack and pinion or other mechanism 23. After electrode 21 has collected an appreciable amount of adhering cathode material, it is raised out of the bath, as shown in Fig. 2, while cathode electrode 22 is simultaneously lowered into the bath. Thus the electrolytic process may proceed while the cathode product paste is being removed from electrode 21.

The reactions taking place during the electrolysis may be indicated as follows:

1. $10CaO \rightarrow 10Ca + 5O_2$
2. $10Ca + 3B_2O_3 \rightarrow CaB_6 + 9CaO$
3. $10C + 5O_2 \rightarrow 10CO$ The CaCl₂ takes no part in the reaction, and is utilized merely as a flux and to increase the fluidity and conductivity of the bath. It will be noted from reaction 2 that a considerable amount of CaO is formed at the cathode. This CaO is retained at the cathode and becomes part of the cathode product, which must later be removed by leaching in order to obtain the pure boride. It would be preferable to remove the CaO from the electrode during the electrolysis. This can be partly accomplished by agitating the molten bath during the process by any desired means. One fairly effective method for accomplishing this is shown in Fig. 3, wherein the cathode electrode 25 is rotatably supported in a bearing 26 and rotated during operation by means of a mechanical drive 28. This serves to inhibit the concentration of CaO at the cathode, resulting in less CaO in the cathode product. The anode in this modification consists of two or more graphite plates 20'.

Another alternative method for continuously depositing calcium boride at the cathode is illustrated in Fig. 4, in which the cathode comprises a plurality of electrodes 32 mounted on a central rotatable or oscillatable holder 30. By oscillating or rotating holder 30, those electrodes 32 which have cathode product deposited on them may be lifted out of the crucible and the material removed therefrom while other cathode electrodes are immersed in the bath and are instrumental in continued production of boride.

To determine the most desirable composition of bath material, a number of tests were made with bath materials of various compositions. Fig. 5 represents the results of a series of these tests, made to determine the preferred ratio of CaO to B₂O₃, these tests being run with a constant CaCl₂ to CaO ratio of 5. Curve 35 shows the current variation with change in CaO/B₂O₃ ratio for a constant temperature of 850° C., while curves 36 and 37 show similar results when temperature are maintained at 1,000° C. and 1,200° C., respectively.

From these curves, it appears that, all other factors being the same, it would be desirable to maintain the CaO/B₂O₃ ratio as high as possible (meaning a low concentration of B₂O₃), since this results in lowering the resistance of the bath. Experiment indicates, however, that, with a CaCl$_2$/CaO ratio of 10, when the CaO/B$_2$O$_3$ ratio is increased above 2, foaming and frothing of the electrolyte interferes with satisfactory operation. Under these circumstances, a CaO/B$_2$O$_3$ ratio of one resulted in very satisfactory operating conditions and good power efficiency, while decrease of the CaO/B$_2$O$_3$ ratio to 2/3 required raising the temperature of the bath above 1,000° C. in order to obtain satisfactory bath conductivity. This is considered too high a temperature for commercial production.

Fig. 6 illustrates the result of a series of tests made to determine the preferred CaCl$_2$/CaO ratio. Curve 40 shows the current variation with change in CaCl$_2$/CaO ratio for a composition maintained at a CaO/B$_2$O$_3$ ratio of one, while curves 41, 42, and 43 show similar results for CaO/B$_2$O$_3$ ratios of 2, 3, and 4, respectively. All of these curves show that the best conductivity is obtained with a CaCl$_2$/CaO ratio of 10, although ratios of from five to fifteen may also be used. From all these curves it is apparent that a bath having the CaO/B$_2$O$_3$/CaCl$_2$ ratio of 1/1/10 is preferred.

It is obvious that, instead of adding lime and boric oxide separately as ingredients of the electrolytic bath, both of these compounds may be supplied by using substantially pure colemanite. Since the ratios of lime and boric oxide in colemanite are not in the preferred ratio, the preferred composition in this case comprises 3 parts calcined colemanite, one part lime, and twenty parts calcium chloride.

While the method of cathode product removal has been particularly described with reference to the production of calcium boride, it will be understood that it is also applicable to the production of other high melting point borides and other materials from molten electrolytes.

It is desired to claim and secure by U. S. Letters Patent:

1. A molten bath for the electrolytic production of calcium boride consisting essentially of one part lime, 0.5 to 1.5 parts boric oxide, and five to fifteen parts flux, by weight.

2. An electrolytic mix consisting essentially of one part lime, 0.5 to 1.5 parts boric oxide, and five to fifteen parts calcium chloride, by weight.

3. An electrolytic mix consisting essentially of one part lime, one part boric oxide, and five to fifteen parts calcium chloride, by weight.

4. An electrolytic mix consisting essentially of lime, boric oxide, and calcium chloride in the ratio, by weight, of one, one and ten, respectively.

5. An electrolytic mix consisting essentially of calcined colemanite, lime, and calcium chloride in the ratio, by weight, of three, one and twenty, respectively.

6. The method of producing calcium boride which comprises passing a current between two electrodes in a molten bath consisting essentially of lime, boric oxide and calcium chloride in the ratio of one, 0.5 to 1.5, and ten, respectively, and then removing the cathode from the bath and scraping the cathode product from said cathode before it has cooled sufficiently to harden.

ABRAHAM L. FOX.